United States Patent [19]

Nishiwaki et al.

[11] Patent Number: 4,688,233
[45] Date of Patent: Aug. 18, 1987

[54] DIGITAL DATA TRANSMITTING DEVICE FOR COMMUNICATION PATHS OF RESTRICTED AND UNRESTRICTED TRANSMISSION CHARACTERISTICS

[75] Inventors: Mitsuo Nishiwaki; Tooru Amano; Tooru Yasuda, all of Tokyo; Sakae Okubo; Naoki Mukawa, both of Kanagawa, all of Japan

[73] Assignee: NEC Corporation, Japan

[21] Appl. No.: 796,094

[22] Filed: Nov. 7, 1985

[30] Foreign Application Priority Data

Nov. 10, 1984 [JP] Japan ................ 59-235948
Nov. 10, 1984 [JP] Japan ................ 59-235949

[51] Int. Cl.$^4$ ........................ H04L 7/00
[52] U.S. Cl. ........................ 375/58; 375/112; 370/102
[58] Field of Search ........... 375/106, 107, 118, 112, 375/102; 370/100, 101, 102, 108; 371/22, 42, 57, 60; 360/7, 54

[56] References Cited

U.S. PATENT DOCUMENTS

| | | | |
|---|---|---|---|
| 3,742,145 | 6/1973 | Clark et al. | 370/102 |
| 4,002,844 | 1/1977 | Doussoux | 370/102 |
| 4,053,715 | 11/1977 | Drapkin | 370/102 |
| 4,058,683 | 11/1977 | Fennoglio | 370/102 |
| 4,353,129 | 11/1982 | Nishiwaki | 375/112 |

Primary Examiner—Jin F. Ng
Assistant Examiner—Stephen Chin
Attorney, Agent, or Firm—Laff, Whitesel, Conte & Saret

[57] ABSTRACT

In a digital data communication network comprising digital data transmitting and receiving devices (111, 122) and first and second digital communication paths (16, 17) connected to each other and to the transmitting and the receiving devices, respectively, a stuffing circuit (23) is controlled by a control signal producing circuit (24) so as to stuff and not to stuff an input bit sequence when at least one of the first and the second digital communication paths has a restricted transmission characteristic and when both of the communication paths have an unrestricted transmission characteristic. Preferably, necessity and unnecessity of stuffing should be detected for a leading and a trailing part of each block with a shorter interval of time than for other parts of the block. More preferably, some of binary one bits placed at the beginnings of the respective blocks are used as a part of a multiframe synchronization pattern for a signal transmitted through the communication paths.

9 Claims, 6 Drawing Figures

DIGITAL DATA TRANSMITTING DEVICE FOR COMMUNICATION PATHS OF RESTRICTED AND UNRESTRICTED TRANSMISSION CHARACTERISTICS

BACKGROUND OF THE INVENTION

This invention relates to a digital data transmitting device for use in a digital data communication network.

Such a digital data transmitting device is used in the network as a first digital data transmitting device together with a first digital data receiving device. The network comprises second digital data transmitting and receiving devices at a remote site or place and first and second digital communication paths or channels which are connected to the first digital data transmitting and receiving devices and to the second digital data transmitting and receiving devices, respectively.

Each digital communication path has either a restricted or an unrestricted transmission characteristic. More particularly, a bit sequence of digital data should always satisfy a certain condition for reliable transmission through a digital communication path of a restricted transmission characteristic. For example, the condition is such that fifteen or more binary zeroes should not continuously appear in the bit sequence and that three or more binary ones should occur in each partial sequence of twenty-four bits. On the other hand, the bit sequence need not satisfy any condition at all for a digital communication path of an unrestricted transmission characteristic.

A general bit sequence may have a part satisfying such a condition and another part which does not satisfy the condition. On transmitting the general bit sequence through a digital communication path of a restricted transmission characteristic, it is necessary for reliable transmission that the condition should be satisfied throughout the general bit sequence. For this purpose, stuffing is carried out for the general bit sequence. In other words, each of the above-mentioned first and second digital data transmitting devices includes a stuffing circuit to which the general bit sequence is supplied as a device input bit sequence. Otherwise, it is impossible to transmit the general bit sequence reliably through the digital communication path of the restricted transmission characteristic.

In the manner which is described in U.S. Pat. No. 4,353,129 issued to Mitsuo Nishiwaki, assignor to NEC Corporation, and will later be described more in detail, the stuffing circuit monitors at first the device input bit sequence by dividing the bit sequence into blocks, each having a block duration. The stuffing circuit thereby detects necessity and unnecessity of carrying out the stuffing for the respective blocks. Whenever the necessity is found, the stuffing circuit carries out the stuffing by forcibly adding a binary one bit as a stuff bit to a unit sequence of n bits where n represents a predetermined natural number. For the above-exemplified condition, the natural number may be equal to seven. In this manner, the stuffing circuit modifies the device input bit sequence into a stuffed bit sequence for reliable transmission through the digital communication path of the restricted transmission characteristic.

Attention should be directed to the fact that (n+1) bits are necessary in the stuffed bit sequence for the unit sequence in each block for which the necessity of stuffing is detected. When both of the afore-mentioned first and second digital communication paths has the unrestricted transmission characteristic, it is possible to raise efficiency of transmission of the device input bit sequence by transmitting the input bit sequence intact as it is. Inclusion of the stuffing circuit is therefore undesirable for a digital communication path of the unrestricted transmission characteristic in that the device input bit sequence is transmitted at a reduced transmission rate, namely, only ineffectively transmitted, at least at a part to which the stuffing is carried out.

SUMMARY OF THE INVENTION

It is therefore an object of the present invention to provide a digital data transmitting device which is capable of effectively and reliably transmitting a bit sequence of digital data through a digital communication path of whichever of restricted and unrestricted transmission characteristics.

It is another object of this invention to provide a digital data transmitting device of the type described, which includes a stuffing circuit and yet which is capable of efficiently transmitting the bit sequence even through a digital communication path of the unrestricted transmission characteristic.

Other objects of this invention will become clear as the description proceeds.

On describing this invention, it is possible to define a digital data transmitting device as being for use as a first digital data transmitting device together with a first digital data receiving device in a digital data communication network comprising second digital data transmitting and receiving devices and first and second digital communication paths connected to the first digital data transmitting and receiving devices and to the second digital data transmitting and receiving devices, respectively, wherein the first digital data transmitting device includes stuffing means responsive to a first bit sequence of digital data for carrying out stuffing to the first bit sequence for transmission to the first digital communication path and wherein the second digital data transmitting device is capable of carrying out stuffing to a second bit sequence of digital data for transmission to the second digital communication path.

According to this invention, the above-defined digital data transmitting device, namely, the first digital data transmitting device, comprises control signal producing means and control means.

The control signal producing means is responsive to a first and a second indication signal for producing a first and a second control signal wherein the first indication signal is indicative of necessity and unnecessity of the stuffing for the first digital communication path and wherein the second indication signal is indicative of necessity and unnecessity of the stuffing for the second digital communication path. The first and the second control signals are produced when the stuffing should be carried out for at least one of the first and the second digital communication paths and when the stuffing need not be carried out both for the first and the second digital communication paths, respectively.

The control means is coupled to the control signal producing means and is for controlling the stuffing means to make and not to make the stuffing means carry out the stuffing in response to the first and the second control signals, respectively.

DESCRIPTION OF THE PREFERRED EMBODIMENTS

Figure 1:
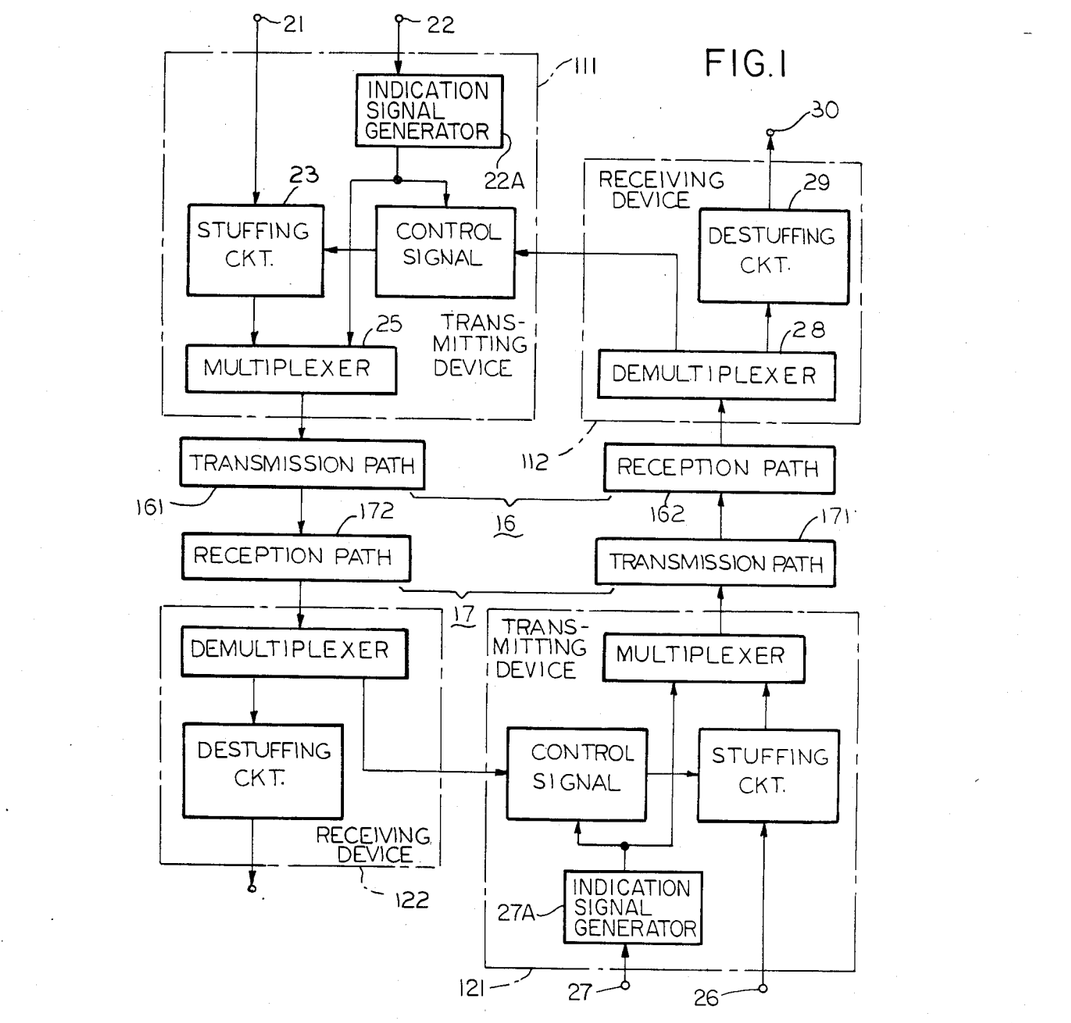
FIG. 1 is a block diagram of a digital data communication network which includes a digital data transmitting device according to a first embodiment of the instant invention.

Referring to FIG. 1, a digital data communication network comprises a first digital data transmitting device 111 according to a first embodiment of the present invention. The transmitting device 111 is for use in combination with a first digital data receiving device 112 at a first site or location. The network comprises second digital data transmitting and receiving devices 121 and 122 at a second site which is remote from the first site. A first digital communication path or channel 16 consists of first transmission and reception paths 161 and 162 which are connected to the first digital data transmitting and receiving devices 111 and 112, respectively. A second digital communication path 17 consists of second transmission and reception paths 171 and 172 connected to the second digital data transmitting and receiving devices 121 and 122. The transmission path 161 or 171 and the reception path 162 or 172 are differently named. It should, however, be understood that each path 161, 162, 171, or 172 is merely a part of a two-way digital communication path.

The first digital data transmitting device 111 has first and second device input terminals 21 and 22. The first device input terminal 21 is supplied with a first bit sequence of digital data representative of a time variable signal, such as a picture signal, an audio signal, or a combination of picture and audio signals. The first bit sequence serves as a device input bit sequence for the first digital data transmitting device 111. The input terminal 22 is supplied from the second device with a first indication signal from generator 22A to provide a first indicating signal which will presently be described.

Each of the first and the second digital communication paths 16 and 17 may have whichever of restricted and unrestricted transmission characteristics. More specifically, the first bit sequence must satisfy a condition, such as exemplified hereinabove, for reliable transmission through a digital communication path of a restricted transmission characteristic. On the other hand, a digital communication path of the unrestricted transmission characteristic always reliably transmits the first bit sequence which is subjected to no condition at all. It is to be noted here that the facts are preliminarily known whether each of the first and the second digital communication paths 16 and 17 is of the restricted or the unrestricted transmission characteristic.

The first indication signal indicates whether or not the first digital communication path 16 is of the restricted transmission characteristic. In other words, the first indication signal indicates necessity or unnecessity of carrying out stuffing to the first bit sequence. When stuffed, the first bit sequence is transmitted from the first digital data transmitting device 111 to the first transmission path 161 as a stuffed bit sequence in the manner which will later be described in detail. When not stuffed, the first bit sequence is transmitted to the first transmission path 161 intact as a non-stuffed bit sequence as it stands. Irrespective of the stuffing, the bit sequence transmitted through the first transmission path 161 will be called a first transmission bit sequence. It is possible in this connection to say that the first indication signal indicates necessity and unnecessity of the stuffing for the first digital communication path 16. The necessity and the unnecessity may be indicated by binary one and zero, respectively.

In the manner which is known in the art and will become clear as the description proceeds, a stuffing circuit 23 carries out the stuffing to the first bit sequence to produce the stuffed bit sequence when the first digital communication path 16 is of the restricted transmission characteristic. For this purpose, the stuffing circuit 23 divides the first bit sequence into blocks of a common block duration which will later be exemplified. The stuffing circuit 23 monitors each block to detect whether the condition for reliable transmission through the digital communication path 16 is satisfied throughout the block or is not satisfied at least at a part of the block. Some of the blocks may not satisfy the condition. In this event, it is herein called that violation is present in either of the part in question or in the first bit sequence. Whenever occurrence of the violation is detected, the stuffing circuit 23 carries out the stuffing by forcibly adding a binary one bit as a stuff bit to a unit sequence of n bits where n represents a predetermined natural number which is typically equal to seven. Furthermore, the stuffing circuit 23 produces a stuff flag for each block to which the stuffing is carried out.

According to this invention, the first digital data transmitting device 111 comprises a control signal producing circuit 24 supplied with the first indication signal from the second device input terminal 22 and a second indication signal delivered from the second digital data transmitting device 121 in the manner which will be described hereunder. Like the first indication signal, the second indication signal indicates whether or not the second digital data transmitting device 121 should carry out stuffing for the second transmission path 171, namely, necessity and unnecessity of the stuffing for the second digital communication path 17. The control signal producing circuit 24 thereby produces a first and a second control signal when the stuffing should be carried out for at least one of the first and the second digital communication paths 16 and 17 and when the stuffing need not be carried out for both of the first and the second digital communication paths 16 and 17, respectively. The first and the second control signals may be binary one and zero, respectively. The control signal producing circuit 24 may alternatively be called a transmission characteristic judging circuit and can readily be implemented by logic gates.

The first and the second control signals are delivered to the stuffing circuit 23 through a connection. When the first control signal is produced, the stuffing circuit 23 produces the stuffed bit sequence. When the second control signal is produced, the stuffing circuit produces the non-stuffed bit sequence. It is now understood that the connection shows a control arrangement coupled to the control signal producing circuit 23 for controlling the stuffing circuit 23 to make and not to make the stuffing circuit 23 carry out the stuffing in response to the first and the second control signals, respectively. The stuffing circuit 23 may comprise for this purpose an input gate (not shown) supplied with the first bit sequence and controlled by the first and the second control signals. A multiplexer 25 multiplexes the first transmission bit sequence of the stuffing circuit 23 and the first indication signal supplied from the second device input terminal 22 into a first multiplexed signal and delivers the first multiplexed signal to the first transmission path 161. When produced, the stuff flag is multiplexed in the first transmission bit sequence in the manner which is known in the art and will be exemplified later in the description.

Figure 2:
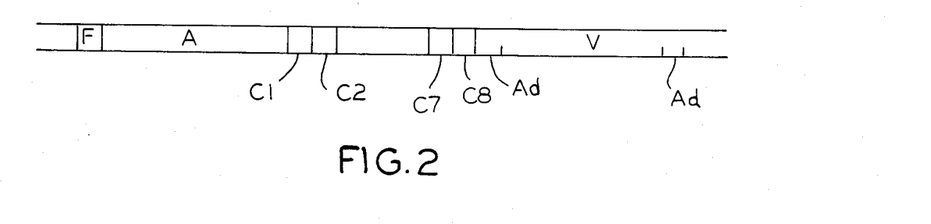
FIG. 2 schematically shows a format of a transmission bit sequence which is transmitted in the network illustrated in FIG. 1.

Turning to FIG. 2 for a short while, a part of the (first) transmission bit sequence is depicted for a device input bit sequence representative of a combination of picture and audio signals. The transmission bit sequence is usually divisible into transmission frames. In the example being illustrated, each transmission frame consists of 192 bits. The afore-mentioned block comprises first through fourth (transmission) frames. The block duration is therefore four frames long. In each block, an odd-numbered frame is a succession of one transmission frame synchronization bit F, eight audio bits A, first through eighth control bits C1, C2, . . . , C7, and C8, and 175 video bits V. An even-numbered frame is a succession of one transmission frame synchronization bit, eight audio bits, and 183 video bits. Some of the video bits are used as the stuff bits in the manner which will shortly be described.

Among the control bits, the first control bit C1 is a dummy bit and is always a binary one bit. The second and the seventh control bits C2 and C7 are collectively used as the stuff flag mentioned above. Whenever the stuffing is carried out for a block, binary one and zero bits are used as the control bits C2 and C7 of the odd-numbered frames of the block under consideration. When the stuffing is not carried out for a block, the control bits C2 and C7 are changed to binary zero and one for the block in question. The third through the sixth control bits are used for other purposes. It is therefore possible to use some of the third through the sixth control bits of the transmission frames in multiplexing the first indication signal in the first multiplexed signal.

It will be understood that the 175 video bits are equal to twenty-two unit sequence exemplified before and twenty-one additional bits and that the 183 video bits are twenty-three unit sequence and twenty-two additional bits. In the manner indicated in the figure by Ad, each additional bit is followed by a unit sequence. When the stuffing is not carried out, the additional bits Ad are used as the video bits. When the stuffing is carried out, the stuff bits are placed at the additional bits Ad throughout each block for which the stuffing is carried out. In this event, only 153 and 160 bits are used as the video bits in each odd-numbered frame and in each even-numbered frame of the block.

Turning back to FIG. 1, the second digital data transmitting device 121 has its first and second device input terminals 26 and 27. The first device input terminal 26 is supplied with a second bit sequence of digital data like the first device input terminal 21 of the first digital data transmitting device 111. Responsive to a signal from the second device input terminal 27 of the second digital data transmitting device 121 is supplied with the aforementioned second indication signal from generator 27A. The second digital data transmitting device 121 is similar in structure and operation to the first digital data transmitting device 111 and delivers a second multiplexed signal to the second transmission path 171. Like the first multiplexed signal, the second multiplexed signal comprises a second transmission bit sequence. The second indication signal may be multiplexed in the second multiplexed signal by using some of the third through the sixth control bits as above.

The first digital data receiving device 112 receives the second multiplexed signal through the first reception path 162. A demultiplexer 28 is for establishing frame synchronism in the known manner and for demultiplexing the second multiplexed signal into the second transmission bit sequence and the second indication signal. Whenever a stuff flag is included in the second transmission bit sequence, a destuffing or unstuffing circuit 29 removes the stuff bits and delivers a reproduction of the second bit sequence to a device output terminal 30. The second indication signal is delivered from the demultiplexer 28 to the control signal producing circuit 24.

Figure 3:
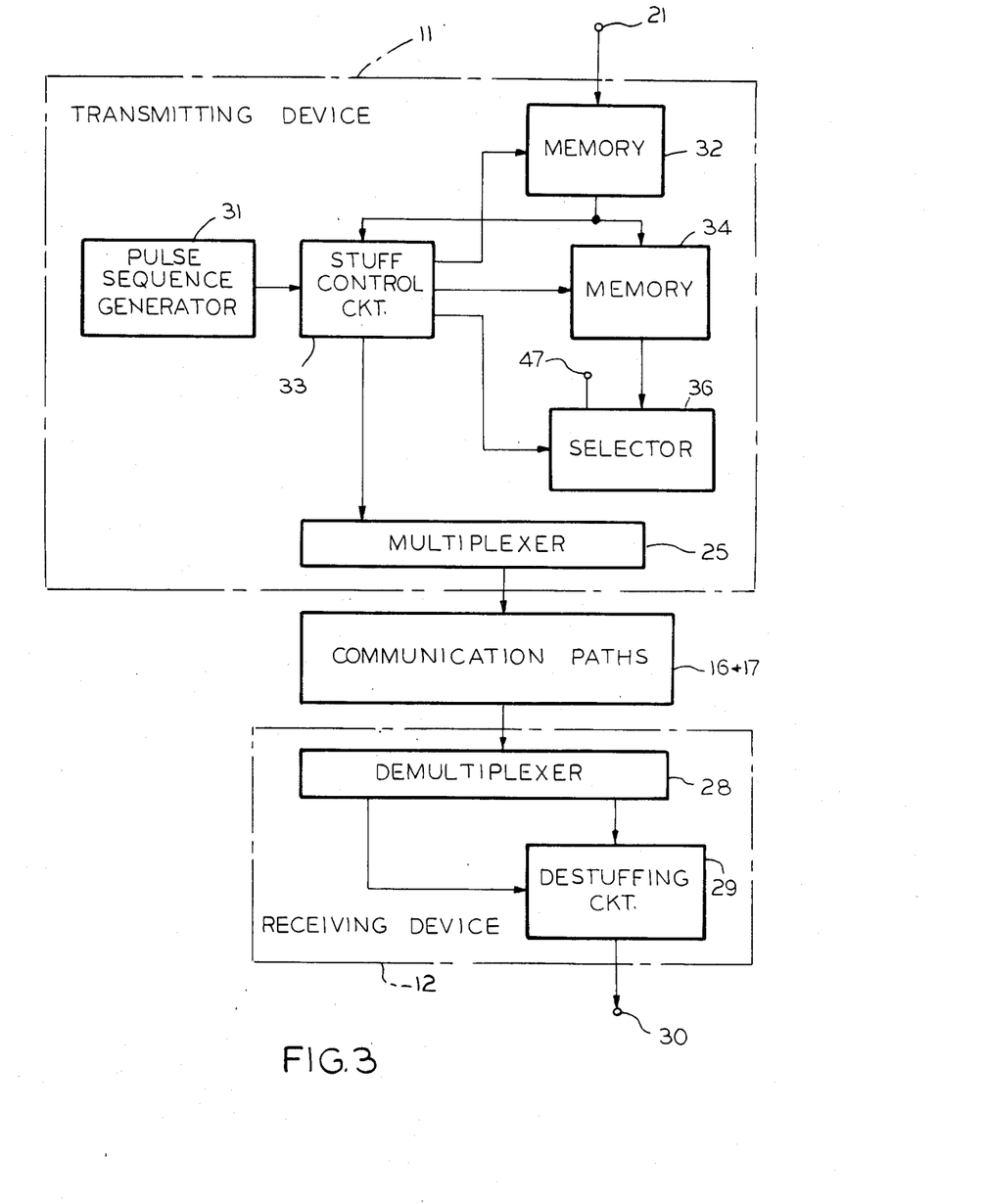
FIG. 3 is a simplified block diagram of a digital data communication network which includes a digital data transmitting device according to a second embodiment of this invention.

Referring to FIG. 3, a digital data communication network comprises a first digital data transmitting device 11 according to a second embodiment of this invention. Like in FIG. 1, the transmitting device 11 is for use together with a first digital data receiving device (not shown) at a first site. The network comprises a second digital data transmitting and receiving devices at a second site. Only the second digital data receiving device is depicted at 12. The digital data transmitting and receiving devices 11 and 12 are connected through first and second digital communication paths 16 and 17 of the type described in conjunction with FIG. 1. It is possible to understand that the digital data transmitting and receiving devices 11 and 12 are depicted merely for simplicity of illustration with omission of the control signal producing circuit 24 (FIG. 1) and the related circuitry.

The transmitting device 11 has a device input terminal which is an equivalent of the first device input terminal of the first digital data transmitting device 111 (FIG. 1) and is therefore designated by the reference numeral 21. The receiving device 12 has a device output terminal which corresponds to the device output terminal of the first digital data receiving device 112 (FIG. 1) and is therefore denoted by the reference numeral 30. The device input terminal 21 is supplied with a device input bit sequence of the type described heretobefore.

In the transmitting device 11, a pulse sequence generator 31 generates a partial sequence timing pulse sequence which defines a partial sequence successively in the device input bit sequence. Monitoring should be carried out whether or not each partial sequence satisfies the condition. The partial sequence timing pulse sequence therefore defines for the condition exemplified before a shorter and a longer monitoring interval of fifteen and twenty-four bits or samples.

According to an aspect of this invention, the pulse sequence generator 31 furthermore produces a block, a first, and a second timing pulse sequence. The block timing pulse sequence defines a block duration of 768 bits when each block of the first transmission bit sequence should consist of four transmission frames exemplified in connection with FIG. 2. Each block of the device input bit sequence includes a leading and a trailing bit which stand first and last in the block. In each block, the first and the second timing pulse sequences define a leading and a trailing part which are shorter than the partial sequence of the shorter monitoring interval. The leading part begins at the leading bit and may be nine bits long. The trailing part ends at the trailing bit and may be eight bits long.

Figure 4:
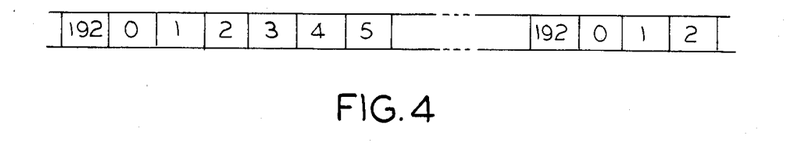
FIG. 4 shows a frame of a transmission bit sequence transmitted in the network depicted in FIG. 3.

FIG. 4 will be referred to at this stage of description. In FIG. 4, a transmission frame consists of 193 bits depicted at 0 through 192. The transmission frame of FIG. 2 has a frame length which is an integral multiple of twenty-four bits and is not an integral multiple of fifteen bits. In contrast, the frame length of FIG. 4 is not an integral multiple of either of twenty-four and fifteen bits. Furthermore, the monitoring intervals are dependent on the transmission characteristic of the digital communication path, such as 16 and/or 17. A partial sequence may therefore be included in two contiguous blocks. This gives rise to problems on monitoring such partial sequences. It has been the custom to get rid of the problems by regularly using a binary one bit as the leading bit of each block at the expense of the efficiency of transmission. As for the transmission frame exemplified in FIG. 2, it is possible to understand that the regular use of the binary one bit is realized by the dummy bit used as the first control bit C1 of each transmission frame. In the manner which will become clear in the following, use of the leading and the trailing parts is for raising the transmission efficiency even though the binary one bit is regularly used as the leading bit of each block. The bit numbered 0 in each frame, is for use as a multiframe synchronization bit which will later be described.

Figure 5:
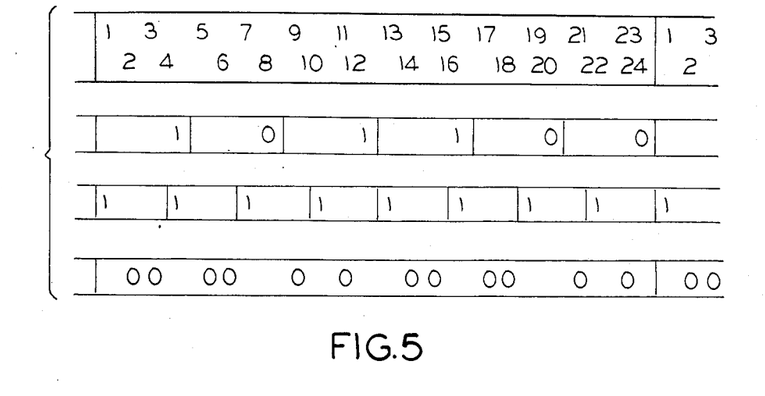
FIG. 5 shows a multiframe of the transmission bit sequence mentioned in conjunction with FIG. 4.

Turning to FIG. 5 temporarily, a multiframe of the transmission bit sequence consists of first through twenty-fourth transmission frames 1, 2, 3, . . . , 23, and 24 in the manner depicted along a first or top line. It will be assumed hereunder that each block consists of three transmission frames. The block duration is therefore 579 bits long rather than 768 bits long as described before with reference to FIG. 2.

Turning back to FIG. 3, the device input bit sequence is temporarily memorized in an input memory 32. Responsive to various timing pulse sequences generated by the pulse sequence generator 31, a stuff control circuit 33 sends reading clocks to the input memory 32. For each block, the leading part is read at first and is sent back to the stuff control circuit 33 and forward to an output memory 34. The stuff control circuit 33 detects occurrence of the violation unless two or more binary one bits appear in the leading part. In the manner which will later be described, a binary one bit may always be used as the leading bit of each block in the known manner. In the meantime, the stuff control circuit 33 similarly receives each partial sequence from the input memory 32 to detect presence and absence of the violation as usual. Either at the end of the shorter and/or the longer monitoring interval or prior to the end, the stuff control circuit 33 receives the trailing part and detects occurrence of the violation unless one or more binary one bits are present.

Figure 6:
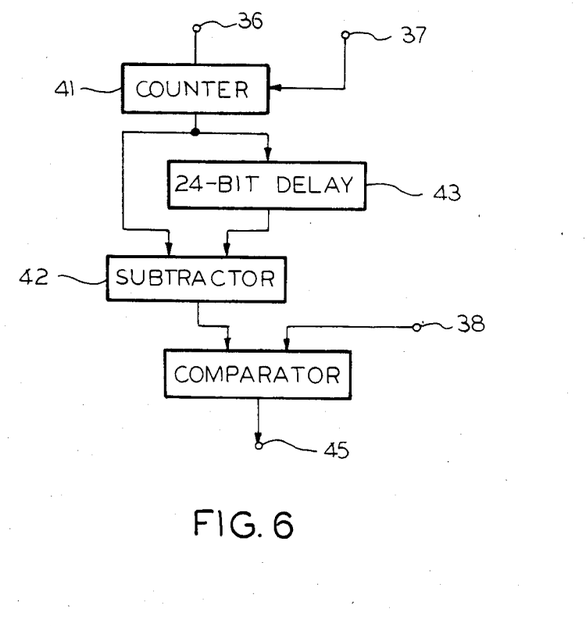
FIG. 6 is a block diagram of a violation detector for use in the digital data transmitting device shown in FIG. 3.

Turning now to FIG. 6, a violation detector is for detecting presence and absence of the violation during the longer monitoring interval and has first through third circuit input terminals 36, 37, and 38 for use in the stuff control circuit 33. The first circuit input terminal 36 is supplied with the device input bit sequence through the input memory 32 (FIG. 3). It will now be assumed that the second circuit input terminal 37 is supplied from the pulse sequence generator 31 with the block timing pulse sequence rather than with the partial sequence timing pulse sequence that defines the longer monitoring interval.

A counter 41 has a reset terminal supplied with the block timing pulse sequence through the second circuit input terminal 37. The block timing pulse sequence resets the counter 41 at the leading bit of each block. Thereafter, the counter 41 counts the binary one bits which appear in the device input bit sequence delivered thereto through the first circuit input terminal 36. The counter 41 thereby produces a count signal representative of an intermediary count of the binary one bits. The count signal is fed to a subtractor 42 directly and through a twenty-four-bit delay circuit 43. The subtractor 42 therefore provides an ultimate count of the binary one bits in the partial sequence of the longer monitoring interval. A comparator 44 is for comparing the ultimate count with a predetermined count which is indicated by a signal supplied to the third circuit input terminal 38. For the condition under consideration, the predetermined number is equal to three. The comparator 44 supplies a circuit output terminal 45 with a stuff selection signal indicative of presence and absence of the violation. It will readily be understood that presence or absence of the violation is likewise detected for the partial sequence of the shorter monitoring interval and for other parts of the device input bit sequence.

Referring back to FIG. 3, the stuff control circuit 33 supplies the output memory 34 with a read signal controlled in consideration of the stuff selection signal in the manner which will shortly become clear. Responsive to the read signal produced in the presence of violation, the output memory 34 supplies a selector 46 with a selected number of bits of the device input bit sequence memorized therein and suspends supply of the bits during a one-bit interval. For the condition being in consideration, the selected number is equal to seven. The selector 46 is controlled by the stuff selection signal and has a selector input terminal 47 which is always supplied with a binary one signal. Only during the one-bit interval, the selector 46 selects the binary one signal as a stuff bit. As will readily be understood, it is thereby possible to make the selector 46 produce a stuffed bit sequence of the type described as regards the video bits V in conjunction with FIG. 2. The binary one bit may be placed at each leading bit by using the block timing pulse sequence.

Either the stuffed bit sequence or a non-stuffed bit sequence is delivered from the selector 46 to a multiplexer which is an equivalent of the multiplexer described in connection with FIG. 1 and is therefore designated by the reference numeral 25. The stuff control circuit 33 delivers a stuff flag to the multiplexer 25 whenever the stuff selection signal indicates occurrence of the violation in either of the leading part, the partial sequence, and the trailing part. The multiplexer 25 delivers a multiplexed signal to the digital communication paths 16 and 17. It is now clear that two connections led to the multiplexer 25 in FIG. 3 correspond to a single connection depicted in FIG. 1 between the stuffing circuit 23 and the multiplexer 25. Incidentally, suspension of read of the output memory 34 gives a reduced rate to transmission of the multiplexed signal through the digital communication paths 16 and 17. The stuff control circuit 33 therefore adjusts the read clocks in compliance with the reduced rate whenever the stuff selection signal indicates occurrence of the violation. From the foregoing description, it will be understood that the stuff control circuit 33 is similar to a conventional one and is readily implemented by one skilled in the art.

The digital data receiving circuit 12 is not different from that described in conjunction with FIG. 1. After the frame synchronization is established, the stuff flag, if any, is separated from the multiplexed signal. In all events, the demultiplexer 28 reproduces the transmission bit sequence from the multiplexed signal. When the transmission bit sequence delivered from the demultiplexer 28 is a stuffed bit sequence, the destuffing or unstuffing circuit 29 removes the stuff bits under the control of the stuff flag. Two connections depicted between the demultiplexer 28 and the destuffing circuit 29 correspond to a sole connection depicted in FIG. 1 therebetween.

Referring again to FIG. 5, a succession of four transmission frames will be called a multiframe synchronization subframe. A multiframe synchronization pattern is given for each multiframe by giving binary one and zero bits to the multiframe synchronization bits of the respective multiframe synchronization subframes in the manner exemplified along a second line. It is possible to use the multiframe synchronization bit of each block of three transmission frames as the afore-mentioned leading bit. In this event, the multiframe synchronization bits are rendered binary one in the manner depicted along a third line. Comparison of the second line with the third line will show that the leading bits of the fourth and the sixteenth transmission frames are used also as the binary one bits of the multiframe synchronization pattern. The multiframe synchronization bits of the second, the third, the fifth, and several other transmission frames are idle in the manner illustrated by circles along a fourth or bottom line. It is now possible to use at least one of the leading bits of the blocks as a part of the binary one bits of the multiframe synchronization pattern and to use the idle bits as the video and/or the audio bits, thereby raising the transmission efficiency.

Corresponding time instants of the above-mentioned fourth and sixteenth transmission frames have an interval which is equal to four blocks and is equal, on the other hand, to three multiframe synchronization subframes. More in general, let each multiframe consist of a first predetermined number of transmission frames. Each block consists of a second predetermined number of the transmission frames where the second predetermined number is equal to an integral submultiple of the first predetermined number. The multiframe synchronization pattern has binary bits at the respective multiframe synchronization subframes, namely, at an interval of a third predetermined number of the transmission frames. Under the circumstances, the binary one bits of the multiframe synchronization pattern have an interval of the transmission frames of a number which is equal to a least common multiple of the second and the third predetermined numbers.

While this invention has thus far been described in specific conjunction with a few preferred embodiments thereof, it will now be readily possible for one skilled in the art to put this invention into effect in various other manners. For example, the digital data transmitting and receiving devices 11 and 12 (FIG. 3) may be used without the control signal producing circuit 24 (FIG. 1) and the related circuitry for digital communication paths 16 and 17 which have either a common restricted transmission characteristic or different restricted transmission characteristics. Instead of the first or the second indication signal, each of the first and the second control signals may be multiplexed in the transmission bit sequence. Incidentally, it is possible to understand a combination of the stuffing circuit 23 and the multiplexer 25 as a stuffing arrangement and to refer to the multiplexed signal, in the manner already so called, as a transmission bit sequence. The word "block" may be reworded into "duration" when used in connection with the transmission bit sequence. The first and the second digital communication paths 16 and 17 may collectively be called a digital communication path depending on the circumstances.

What is claimed is:

1. A digital data transmitting device for use as a first digital data transmitting device together with a first digital data receiving device in a digital data communication network comprising second digital data transmitting and receiving devices and first and second digital communication paths connected to said first digital data transmitting and receiving devices and to said second digital data transmitting and receiving devices, respectively, said first digital data transmitting device including stuffing means responsive to a first bit sequence of digital data for carrying out stuffing to said first bit sequence for transmission to said first digital communication path, said second digital data transmitting device being capable of carrying out stuffing to a second bit sequence of digital data for transmission to said second digital communication path, wherein the improvement comprises:

first indication signal generating means included in said first digital data transmitting device for generating a first indication signal indicative of a necessity and an unnecessity of the stuffing for said first digital communication path;

second indication signal generating means included in said second digital data transmitting device for generating a second indication signal indicative of a necessity and an unnecessity of the stuffing for said second digital communication path; and control means included in said first digital data transmitting device for controlling said stuffing means to make the stuffing means carry out the stuffing when at least one of said first indication signal and said second indication signal sent from the second digital transmitting device indicates a necessity of the stuffing and not to make the stuffing means carry out the stuffing when said first and second indication signals indicate an unnecessity of the stuffing.

2. A digital data transmitting device as claimed in claim 1, wherein said stuffing means comprises:

detecting means coupled to said control signal producing means through said control means for detecting occurrence of violation in said first bit sequence to produce a detection signal when the violation is present in said first bit sequence and furthermore only when said first control signal is produced;

stuff inserting means coupled to said detecting means for carrying out the stuffing to said first bit sequence and for producing said first bit sequence intact when said detection signal is and is not produced, respectively, said stuff inserting means thereby producing a transmission bit sequence in which the stuffing is and is not carried out when said detection signal is and is not produced, respectively; and multiplexing means coupled to said stuff inserting means and said control signal producing means for multiplexing said transmission bit sequence and said first indication signal into a multiplexed signal for transmission to said first digital communication path.

3. A digital data transmitting device as claimed in claim 1, wherein said control signal producing means comprises:

first means for receiving said first indication signal;

second means for coupling to said second digital data transmitting device through said first digital data receiving device and said first and said second digital communication paths for receiving said second indication signal from said second digital data transmitting device; and third means coupled to said first and said second means for producing said first and said second control signals when at least one of said first and said second indication signals indicates the necessity and when both of said first and said second indication signals indicate the unnecessity, respectively;

said control means being coupled to said third means.

4. A digital data transmitting device as claimed in claim 3, wherein said stuffing means comprises:

detecting means coupled to said third means through said control means for detecting occurrence of violation in said first bit sequence to produce a detection signal when the violation is present in said first bit sequence and furthermore only when said first control signal is produced;

stuff inserting means coupled to said detecting means for carrying out the stuffing to said first bit sequence and for producing said first bit sequence intact when said detection signal is and is not produced, respectively, said stuff inserting means thereby producing a transmission bit sequence in which the stuffing is and is not carried out when said detection signal is and is not produced, respectively; and multiplexing means coupled to said stuff inserting means and said first means for multiplexing said transmission bit sequence and said first indication signal into a multiplexed signal for transmission to said first digital communication path.

5. A digital data transmitting device as claimed in claim 1, said stuffing means including a stuffing circuit for carrying out the stuffing whenever a partial sequence of said first bit sequence does not satisfy a condition for reliable transmission through at least one of said first and said second digital communication paths, wherein said stuffing means comprises:

a pulse sequence generator for generating a block, a first, and a second timing pulse sequence, said block timing pulse sequence defining a succession of blocks, each block consisting of a predetermined number of bits including a leading and a trailing bit, said first and said second timing pulse sequences defining a leading and a trailing part of each block, each of said leading and said trailing parts being shorter than said partial sequence, said leading and said trailing parts beginning at said leading bit and ending at said trailing bit, respectively:

said stuffing circuit being responsive to said first and said second timing pulse sequences for carrying out the stuffing also when either of said leading and said trailing parts does not satisfy said condition.

6. A digital data transmitting device as claimed in claim 5, said stuffing circuit producing a transmission bit sequence for transmission to said first digital communication path, said transmission bit sequence consisting of a succession of durations corresponding to the respective blocks, each duration including a leading bit corresponding to the leading bit of each block, the leading bit of each duration being given by a binary one bit, wherein the binary one bits of selected ones of said durations are used as a part of a multiframe synchronization pattern.

7. A digital data transmitting device for connection to a digital communication path and including a stuffing circuit for carrying out stuffing to an input bit sequence of digital data for transmission to said digital communication path wherein:

the improvement comprises a pulse sequence generator for generating a block, a first, and a second timing pulse sequence, said block timing pulse sequence defining a successful of blocks, each block consisting of a predetermined number of bits including a leading and a trailing bit, said first and said second timing pulse sequences defining a leading a trailing parts being shorter than said partial sequence, said leading and said trailing parts beginning at said leading bit and ending at said trailing bit, respectively;

detecting means included in said stuffing circuit and responsive to said first and second timing pulse sequences for detecting that either of said leading and said trailing parts does not satisfy a predetermined condition for reliable transmission through said digital communication path to produce a violation detection signal; said stuffing circuit responsive to the violation detection signal for carrying out the stuffing.

8. A digital data transmitting device as claimed in claim 7, said stuffing circuit producing a transmission bit sequence for transmission to said digital communication path, said transmission bit sequence consisting of a succession of durations corresponding to the respective blocks, each duration including a leading bit corresponding to the leading bit of the block, the leading bit of each duration being given by a binary one bit, wherein the binary one bits of predetermined ones of said durations are used as a part of a multiframe synchronization pattern.

9. A digital data transmitting device as claimed in claim 8, each multiframe consisting of a first predetermined number of transmission frames, each duration consisting of a second predetermined number of the transmission frames, said second predetermined number being equal to an integral submultiple of said first predetermined number, said multiframe synchronization pattern having binary bits at an interval of a third predetermined number of the transmission frames, wherein the binary one bits of said multiframe synchronization pattern have an interval of the transmission frames of a number which is equal to a least common multiple of said second and said third predetermined numbers.

* * * * *

UNITED STATES PATENT AND TRADEMARK OFFICE
CERTIFICATE OF CORRECTION

PATENT NO. : 4,688,233
DATED : August 18, 1987
INVENTOR(S) : Mitsuo Nishiwaki, etal It is certified that error appears in the above-identified patent and that said Letters Patent is hereby corrected as shown below:

On The Title Page, Item [73] should read

--NEC Corporation and Nippon Telegraph and Telephone Corporation, Tokyo, Japan --.

Signed and Sealed this

First Day of March, 1988

Attest:

DONALD J. QUIGG

Attesting Officer

Commissioner of Patents and Trademarks